No. 850,809. PATENTED APR. 16, 1907.
A. H. WILSON.
TIRE BOLTING MACHINE.
APPLICATION FILED JUNE 14, 1906.
2 SHEETS—SHEET 1.
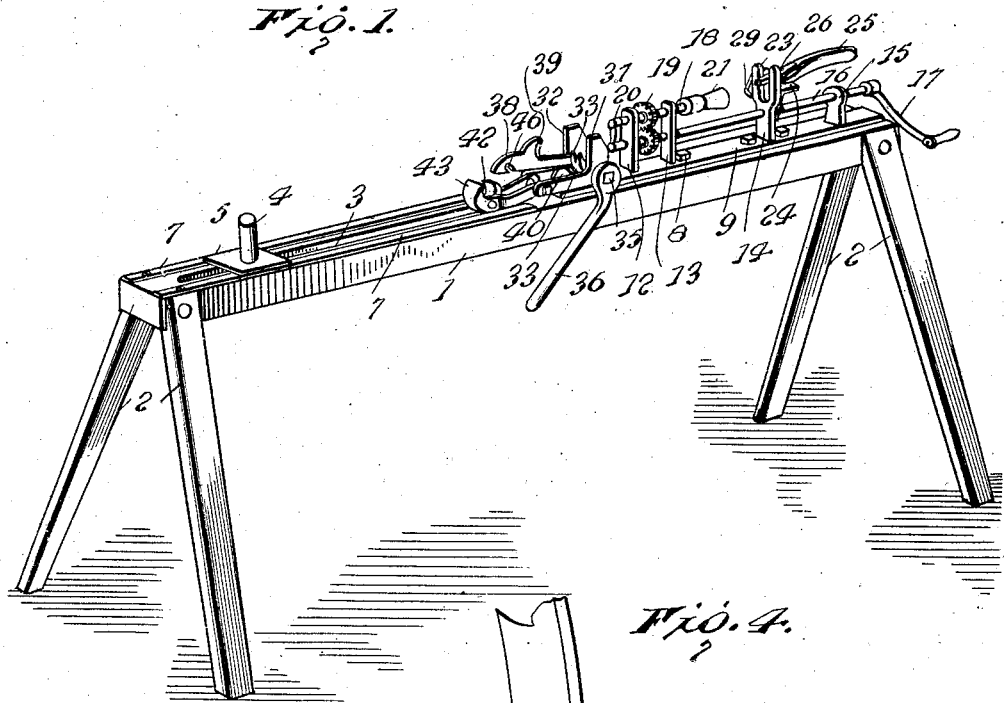
Inventor
A. H. Wilson No. 850,809. PATENTED APR. 16, 1907.
A. H. WILSON.
TIRE BOLTING MACHINE.
APPLICATION FILED JUNE 14, 1906.
2 SHEETS—SHEET 2.
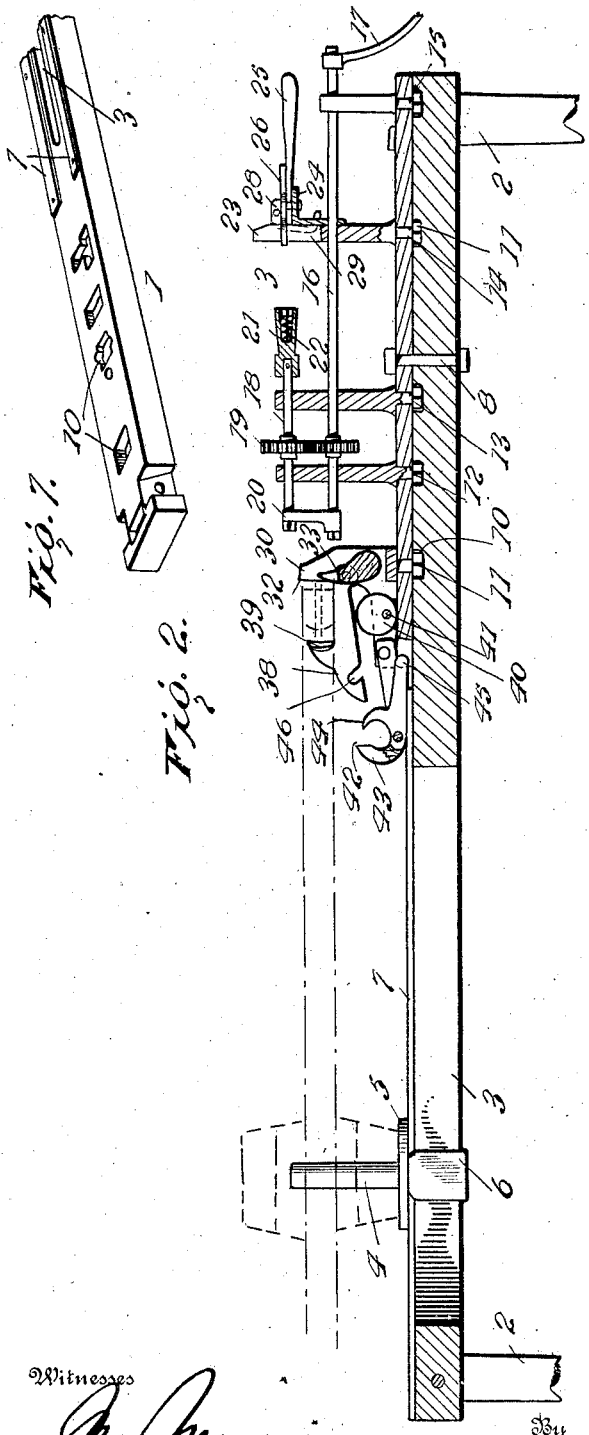
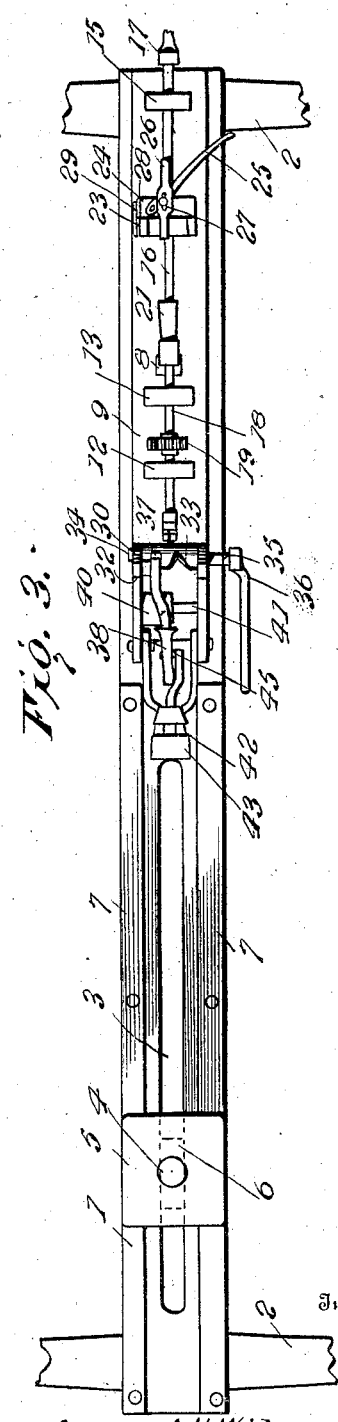
Witnesses
Inventor
A. H. Wilson
By
Attorneys

UNITED STATES PATENT OFFICE.

ARTHUR H. WILSON, OF LOOGOOTEE, ILLINOIS, ASSIGNOR OF ONE-HALF TO D. PRYOR, OF LOOGOOTEE, ILLINOIS.

TIRE-BOLTING MACHINE.

No. 850,809.	Specification of Letters Patent.	Patented April 16, 1907.

Application filed June 14, 1906. Serial No. 321,773.

*To all whom it may concern:*

Be it known that I, ARTHUR H. WILSON, a citizen of the United States, residing at Loogootee, in the county of Fayette and State of Illinois, have invented certain new and useful Improvements in Tire-Bolting Machines, of which the following is a specification.

The object of my invention is to provide an improved tire-bolting machine which will be efficient in operation and durable in construction and which will combine in the one machine practically all the various appliances necessary for a wheelwright in removing and bolting tires and repairing a wheel, said machine having incorporated in it the following novel and useful features: first, a nut applying and removing device embodying a horizontal counter-shaft driven from a similar drive-shaft and arranged for a longitudinal sliding movement so as to enable the operator to manipulate the machine rapidly for screwing on and taking off nuts; second, an improved construction of bolt-holder and fork which is used in holding the bolt from turning while force is applied to screw on or take off the nut that will allow adjustment of the holder to accommodate bolts that are put in diagonally instead of a truly radial direction, which often happens when the tire has been set before; third, the use of a coil-spring mounted in the wrench-head so as to eject the nuts after they have been withdrawn from the bolt and preclude the possibility of their sticking in the wrench; fourth, the adjustable base-plate for carrying the operating parts so arranged that it may be moved in a horizontal plane on the supporting-bench to operate upon nuts and bolts that are in a corner close to a spoke; fifth, an improved device for extracting the bolts of a wheel, embodying a hook to start the bolt back even with the inside of the felly and an improved arrangement of claw to extract the bolt after it has been once started with the hook; sixth, an improved arrangement of bolt-clipper which is actuated by the same mechanical elements as the bolt-extractor and starter, the latter combining the function of starting bolts and of serving as an eccentric-link to operate the movable jaw of the bolt-clipper.

For a full description of the invention and the merits thereof and also to acquire a knowledge of the details of construction of the means for effecting the result reference is to be had to the following description and accompanying drawings, in which—

Figure 1 is a perspective view. Fig. 2 is a longitudinal section. Fig. 3 is a top plan view. Fig. 4 is an enlarged detailed top plan view. Fig. 5 is a detail elevation showing a bolt being removed. Fig. 6 is a similar view showing a bolt being cut. Fig. 7 is a detail perspective view of a portion of the bench.

Corresponding and like parts are referred to in the following description and indicated in all the views of the drawings by the same reference characters.

Referring to the drawings, the numeral 1 indicates the bench or support for my improved tire-bolting machine, the same being mounted upon legs 2. At one end the bench is provided with a longitudinal slot 3, designed for the reception of a post 4, to be inserted in the hub of the wheel to hold it in proper position for being operated upon. The post 4 is provided with a wear-plate 5 and a guide-lug 6 below the same, the guide-lug being seated directly in the slot 3 and the wear-plate resting upon wear-strips 7, arranged longitudinally of the upper surface of the bench. These wear-plates 7 are of metal and are only necessary if the bench itself be of wood, and it is to be understood that the said bench may be constructed of any desired material. Near its other end the bench is provided with a pivot-stud 8, on which a base-plate 9 is mounted intermediate of its ends, so as to be supported on the bench to turn within certain limits in a horizontal plane. The bench is provided with laterally-elongated slots 10, and stop-lugs 11 project from the lower face of the base-plate 9 and move in said slots, so as to limit the pivotal movement of the base-plate. In the present instance these stop-lugs 11 are in the form of projecting bolts and nuts that detachably secure standards to the base-plate, said standards being designated 12, 13, 14, and 15 and projecting upwardly from the face of said plate. A horizontal drive-shaft 16 is journaled in said standards and is provided with a crank-handle 17 or similar device for turning it. A counter-shaft 18 is also mounted between two of said standards, as shown in the drawings, and pinions 19 are mounted on the respective shafts and mesh with each other, so as to drive the counter-shaft from the shaft 16. Both of these shafts have a limited sliding movement in a longitudinal direction as well as a rotary movement, this sliding movement being limited by means of the pinions 19 contacting with the standard 12 or the standard 13. At one end the said shafts 16 and 18 are connected together by means of a link 20, which has a broad bearing upon the drive-shaft 16 and a relatively smaller bearing upon the counter-shaft 18. The counter-shaft 18 is provided with a wrench-head 21, detachably fitted within a socket within the shaft, so that one wrench-head may be removed and another of a different size inserted, according to the nut that is to be screwed on or fitted. The wrench-head is provided with an ejecting-spring 22, so that after a nut has been removed the spring will force the nut from the head and allow it to drop into a pan or the like underneath the bench. Facing the outer end of the wrench-head 21 is an upright fork 23 on the upper end of the standard 14, and to the outer side of said fork is secured an angular bracket 24. On said bracket there is fulcrumed a clamping-lever 25, the movement thereof being in a horizontal plane. A double-ended tooth 26 is pivotally mounted upon the lever 25 near the fulcrum thereof and is designed to have either one or the other of its teeth project into the fork, so as to hold the bolts from turning while the nut is being screwed on it or being unscrewed from it. This tooth 26 is pivoted by means of a stud taking in either one of two or more holes 27, so that the position of said tooth on the clamping-lever may be adjusted as the occasion requires. As the double-ended tooth 26 projects into the fork it is held in an oblique position by either one of the arms of the fork and prevented from swinging around freely upon its supporting-lever 25, so that the bolt may be held from turning when the holders constituted by the lever and its tooth are adjusted to accommodate themselves to bolts that are put in diagonally instead of a truly radial direction, which often happens if the tire has been set before. The bracket 24 is provided at one side with an upwardly-extending member 28, on which the bracing-hook 29 is pivoted, said hook being of inverted-U shape and designed to take over the felly of a wheel to hold the same from turning about the hub as a center while the wrench-head is operated.

Between the standards before described and the post 4 the base-plate 9 carries a stand 30, which comprises two L-shaped arms or members 31, the upwardly-extending portions of which provide shoulders 32, facing the post 4. A bolt-extracting claw 33 is mounted on trunnions 34 between the two members 31 of said standard 30, and one of said trunnions is extended and has a polygonal end 35, designed to receive the operating-handle 36. An arm 38 is pivoted at one end to said claw to swing eccentrically of the trunnion thereof. The arm 38 is formed on its upper edge with a hook 39, facing away from the post 4, and to support said arm 38 in proper position for one of its functions I have provided a transversely-slidable arm-support 40, which is in the form of a disk mounted to slide upon a spindle 41, secured to the members 31 of the stand 30. A bolt-cutter 42 is pivotally mounted in the ends of the horizontally-extending portions of the members 31, the main jaw 43 of said bolt cutter or clipper being bifurcated, as shown, and the pivoted jaw 44, designed to coact with the main jaw, being pivoted thereto near the outer ends of the two jaws, as shown. The free end of the pivoted jaw 44 is provided with a laterally-projecting stud 45, and the arm 38 has a downwardly-facing recess 46, designed for detachable engagement with said stud whenever it is desired to actuate the bolt-clipper.

In practical operation the wheel to be operated upon has its hub inserted over the post 4, and it is then supported in position, so that it can be slid along the bench in convenient relation for the various tools of my improved machine. If it be desired, for instance, to remove the bolts from a tire, the wheel is slid along the bench until the felly is in position between the fork 23 and the wrench-head 21. Then the operator with one hand clamps the tooth 26 against the head of the bolt, inserts the bracing-hook 29 over or around the felly, slides the shafts 16 and 18 longitudinally until the wrench-head 21 is received upon the nut, and then with his other hand turns the crank-handle 17 and rapidly removes the nut. As the nut is removed it is ejected by the spring 22. To then retract the bolt, the wheel is slid backwardly along the bench until the felly is received between the shoulders 32 and the hook 39 on the arm 38, said arm being supported in a substantially horizontal position by means of the slidable arm-support 40. The hook 39 is placed up against the projecting end of the bolt, and the handle 36 is then manipulated by the operator to force the hook outwardly, and thereby start the bolt and move it until its inner end is flush with the inner side of the felly. Then the claw 33 is brought into operation, as the head of the bolt is in a projecting position beyond the tire, and by another manipulation of the handle 36 the bolt may be withdrawn straight out from its hole without danger of mutilating any of its threads. If it be desired to apply the bolts instead of removing them, the operation of the wrench is substantially the same, except that its rotary movement is reversed, and after the nut has been tightened it may be necessary to clip off the small projecting end of the bolt beyond the nut. To accomplish this, the wheel is moved backwardly along the bench until the tire again rests against the shoulder 32. During the previously-described operation the bolt cutter or clipper 42 is turned down and lies along the bench; but in its operation of clipping the bolt the bolt-clipper is turning upwardly into a substantially vertical position with its upper jaw resting upon the upper end of the bolt. In this operation also the arm-support 40 is removed from underneath the arm 38 by a transversely-sliding movement and the arm 38 is allowed to drop until its recess 46 receives the laterally-projecting stud 45 on the pivot-jaw 44. Then the operator by means of the handle 36 draws the eccentric-arm 38 outwardly, which moves the pivoted jaw forcibly against the under side of the nut, and the two jaws clip off the projecting end of the nut in this manner. It will thus be seen that the eccentric-arm 38 performs the double function of starting the bolt in one operation and of serving as an eccentric-link to operate the movable jaw of the bolt-clipper in the other operation.

As has been before described, the base-plate 9 is mounted on the bench 1, so as to have a slightly rocking movement in a horizontal plane. Hence the base-plate may be moved diagonally upon the bench to operate upon the nuts and bolts that may happen to be in corners close to a spoke, and as this often happens the advantage of this arrangement is at once apparent.

From the foregoing description, in connection with the accompanying drawings, it will be seen that I have provided an improved construction of tire-bolting machine which embodies to a marked degree the assemblage of advantageous features pointed out at the outset of the specification.

Having thus described the invention, what is claimed as new is—

1. In a machine of the character described the combination with a support, of a hub-post longitudinally adjustable on said support, a base-plate mounted to swing in a horizontal plane on said support, and an appliance mounted on said base-plate for operating upon bolts.

2. In a machine of the character described, the combination of a bench designed to support a wheel in position to be operated upon, said bench being provided with a pivoted stud, a base-plate pivotally mounted upon said stud intermediate of its ends to swing in a horizontal plane, means for limiting said swinging movement of the base-plate and bolt-and-nut tools mounted upon said base-plate.

3. In a machine of the character described the combination of a bench adapted to support a wheel in position to be operated upon, said bench being provided with a pivot-stud and with transversely-elongated slots, a base-plate, and bolt-operating tools mounted thereon, said base-plate being pivotally mounted on said stud and provided with stop-lugs working in said slots as and for the purpose set forth.

4. In a machine of the character described the combination of a support adapted to hold a wheel in position to be operated upon a drive-shaft journaled in suitable standards on said support, a counter-shaft arranged to be actuated by said drive-shaft, both the drive-shaft and counter-shaft having a longitudinally-slidable as well as rotary movement, and a wrench-head carried by said counter-shaft.

5. In a machine of the character described, the combination of a support adapted to hold a wheel in position to be operated upon, a wrench-head operatively mounted upon said support, a standard projecting upwardly from the support in proximity to said wrench-head, means for actuating said wrench-head, the upper end of said standard being provided with a fork, and a bolt-clamping lever provided with a clamping-tooth adapted to project through the fork, said clamping-tooth being pivoted on the lever, as and for the purpose set forth.

6. In a machine of the character described, the combination of a bench adapted to support a wheel in position to be operated upon, a wrench-head operatively mounted upon said bench, a fork projecting upwardly above the bench in proximity to said wrench-head, a clamping-lever fulcrumed on the outer side of said fork, a bolt-clamping tooth provided with a plurality of apertures, and a pivot-stud projecting from said lever and designed to be received in any one of said apertures whereby to pivotally mount the said tooth on said lever.

7. In a machine of the character described the combination of a bench adapted to support a wheel in position to be operated upon, a stand mounted on said bench, said stand consisting of two angular members the upwardly-projecting ends of which produce shoulders 32, against which the tire of the wheel is adapted to rest, a bolt-starting hook pivotally mounted between said members and facing said shoulders, means for supporting said hook in a raised position and against the inner end of a bolt, and means for moving said hook outwardly for the purpose specified.

8. In a machine of the character described the combination of a bench adapted to support a wheel in position to be operated upon, a stand mounted on said bench, said stand consisting of two angular members the upwardly-projecting ends of which produce shoulders 32, against which the tire of the wheel is adapted to rest, a bolt-starting hook pivotally mounted between said members and facing said shoulders, removable means for supporting said hook against the inner end of a bolt, said means being adapted to allow said hook to drop when removed from underneath the same, and means for moving said hook outwardly.

9. In a device of the character described the combination of a bench adapted to support a wheel in position to be operated upon, a stand mounted upon said bench, a bolt-starting hook pivotally mounted on said stand, and a transversely-movable disk adapted to be moved underneath said hook to support the same in operative position and away from said hook to allow the latter to drop to an operative position.

10. In a device of the character described, the combination of a bench adapted to support a wheel in position to be operated upon, a stand mounted on said bench, a bolt-extracting claw pivotally mounted upon said stand and provided at one side with a slot, and an arm 38 pivotally mounted at one end in said slot eccentrically of the axis of said claw.

11. In a machine of the character described, a stand, a bolt-clipper mounted upon said stand and comprising a main jaw pivotally mounted on the stand to swing in a vertical plane whereby it may be turned downwardly into an inoperative position and upwardly into an operative position, and a movable jaw pivotally connected to said main jaw, an eccentrically-mounted arm arranged for connection to said movable jaw, and means for actuating said arm.

12. In a machine of the character described, a stand, a bolt-clipper mounted upon said stand and embodying a main jaw and a movable jaw, an eccentrically-mounted arm arranged for detachable connection on said movable jaw, and means for actuating said arm.

13. In a machine of the character described, a stand, a bolt-clipper mounted on said stand and embodying a main jaw and a movable jaw pivoted thereto and provided with a laterally-extending side at its handle end, a counter-arm mounted in said standard, and means for actuating said arm, said arm being provided on its upper side with an outwardly-facing hook and in its lower edge with a downwardly-facing recess arranged for engagement with said stud.

14. In a machine of the character described, the combination of a bench adapted to support a wheel in position to be operated upon, a stand mounted on said bench and arranged to support the tire of a wheel as against outward movement, a bolt-starting hook pivotally connected to said stand to swing in a vertical plane, means for supporting said hook in a raised position against the inner end of the bolt, and means for moving said hook outwardly, for the purpose specified.

15. In a device of the character described, the combination of a bench adapted to support a wheel in position to be operated upon, a standard mounted on said bench, a bolt-extracting claw pivotally mounted on said standard, and a bolt-starting hook pivotally connected to the claw eccentrically thereof.

16. In a machine of the character described, the combination of a standard, a bolt-clipper mounted on said standard, a bolt-extracting claw pivotally mounted on said standard, and an operative connection between said claw and said bolt-clipper.

17. In a machine of the character described, the combination of a standard, a bolt-clipper mounted on said standard and embodying a main jaw and a movable jaw, a bolt-extracting claw pivotally mounted on the standard, and a detachable operative connection between said claw and the movable jaw of the bolt-clipper.

18. In a machine of the character described, the combination of a standard adapted to receive the rim of a wheel for operation thereon, a bolt-clipper mounted on the standard and embodying a main jaw pivotally connected to the standard, and a relatively movable jaw connected to the main jaw.

19. In a machine of the character described, the combination of a standard, a bolt-clipper mounted on said standard, a bolt-extracting claw pivotally connected to said standard, means for swinging said claw about one end, a bolt-starting hook connected to said claw, and a bolt-starting hook, said hook constituting a hinged connection between the claw and the bolt-clipper.

20. In a machine of the character described, the combination of a standard, a bolt-clipper mounted on said standard, a bolt-extracting clutch pivoted at one end upon said standard, means for actuating said claw, and a bolt-starting hook concentrically pivoted to said claw and constituting a link connection between the latter and the bolt-clipper.

In testimony whereof I affix my signature in presence of two witnesses.

ARTHUR H. WILSON. [L. S.]

Witnesses:
T. W. SMITH,
A. O. LENZ.